(12) United States Patent
Price

(10) Patent No.: US 7,430,460 B2
(45) Date of Patent: Sep. 30, 2008

(54) METHOD FOR DETERMINING ROLL RATE GYRO BIAS IN AN ATTITUDE HEADING REFERENCE SYSTEM

(76) Inventor: Ricardo A. Price, 1109 Main St., Suite 560B, Boise, ID (US) 83702

( * ) Notice: Subject to any disclaimer, the term of this patent is extended or adjusted under 35 U.S.C. 154(b) by 160 days.

(21) Appl. No.: 11/088,697

(22) Filed: Mar. 23, 2005

(65) Prior Publication Data

US 2006/0217852 A1     Sep. 28, 2006

(51) Int. Cl.
*G01C 23/00* (2006.01)
*G01C 19/46* (2006.01)
*G05D 1/00* (2006.01)
*G05D 1/08* (2006.01)
*G06F 17/00* (2006.01)
*B64C 17/00* (2006.01)

(52) U.S. Cl. ............. 701/3; 701/4; 701/10; 701/14; 244/76 R; 244/180; 74/5.41

(58) Field of Classification Search ............. 701/3, 701/4, 7, 10, 14; 74/5, 5.34, 5.41, 5.14; 73/488, 73/504.2; 244/3.2, 75.1, 76 C, 76 R, 175, 244/179; 33/318, 321; 342/357.14; 702/87, 702/104, 141, 144, 146, 147, 151, 153
See application file for complete search history.

(56) References Cited

U.S. PATENT DOCUMENTS

| | | | | |
|---|---|---|---|---|
| 3,984,748 A | * | 10/1976 | Sullivan | 318/648 |
| 4,067,517 A | | 1/1978 | Barnum | |
| 4,212,443 A | * | 7/1980 | Duncan et al. | 244/177 |
| 4,343,035 A | | 8/1982 | Tanner | |
| 4,608,641 A | | 8/1986 | Snell | |
| 4,831,544 A | * | 5/1989 | Hojo et al. | 701/220 |
| 4,914,598 A | * | 4/1990 | Krogmann et al. | 701/11 |
| 5,050,086 A | | 9/1991 | Lambregts | |
| 5,654,906 A | * | 8/1997 | Youngquist | 702/94 |
| 5,742,919 A | * | 4/1998 | Ashrafi et al. | 701/70 |
| 5,834,623 A | * | 11/1998 | Ignagni | 702/105 |
| 5,841,018 A | * | 11/1998 | Watson et al. | 73/1.81 |
| 5,886,257 A | * | 3/1999 | Gustafson et al. | 73/178 R |
| 6,292,759 B1 | * | 9/2001 | Schiffmann | 702/151 |
| 6,341,248 B1 | * | 1/2002 | Johnson | 701/4 |
| 6,473,676 B2 | * | 10/2002 | Katz et al. | 701/4 |
| 6,480,152 B2 | * | 11/2002 | Lin et al. | 342/357.14 |
| 6,516,272 B2 | * | 2/2003 | Lin | 701/214 |
| 6,556,897 B2 | * | 4/2003 | Katz et al. | 701/4 |
| 6,564,125 B2 | * | 5/2003 | Pattok et al. | 701/29 |
| 6,882,964 B2 | * | 4/2005 | Bayard et al. | 702/191 |
| 6,904,377 B2 | * | 6/2005 | Liu et al. | 702/92 |
| 6,922,618 B2 | * | 7/2005 | Luo | 701/3 |
| 7,216,055 B1 | * | 5/2007 | Horton et al. | 702/153 |
| 2001/0039467 A1 | * | 11/2001 | Katz et al. | 701/4 |
| 2002/0183958 A1 | * | 12/2002 | McCall et al. | 702/141 |
| 2002/0193916 A1 | * | 12/2002 | Katz et al. | 701/4 |
| 2003/0135327 A1 | * | 7/2003 | Levine et al. | 701/220 |
| 2003/0191561 A1 | * | 10/2003 | Vos | 701/3 |
| 2005/0080543 A1 | * | 4/2005 | Lu et al. | 701/70 |
| 2006/0058928 A1 | * | 3/2006 | Beard et al. | 701/11 |
| 2006/0156810 A1 | * | 7/2006 | Brett et al. | 73/382 G |

OTHER PUBLICATIONS

Greg Welch and Gary Bishop, An Introduction to the Kalman Fitter, TR 95-041 Department of Computer Science, University of North Carolina at Chapel Hill, Updated: Monday, Apr. 5, 2004.

Larry J. Levy, Innovation The Kalman Filter: Navigation's Integration Workhorse, The Johns Hopkins University Applied Physics Laboratory, Mar. 29, 2002.

* cited by examiner

*Primary Examiner*—Jack W Keith
*Assistant Examiner*—Jonathan M Dager
(74) *Attorney, Agent, or Firm*—Fulbright & Jaworski, LLP

(57) ABSTRACT

A method and computer program product for determining the roll rate gyro bias of an attitude and heading reference system from true air speed, heading rate and body accelerations using centripetal force equations.

10 Claims, No Drawings

METHOD FOR DETERMINING ROLL RATE GYRO BIAS IN AN ATTITUDE HEADING REFERENCE SYSTEM

TECHNICAL FIELD

The present invention relates generally to systems and methods for the accurate determination of an aircraft's attitude and heading and, more particularly, to apparatus, methods, and computer program products for determining the roll rate gyro bias from true air speed, heading rate and body accelerations using centripetal force equations.

BACKGROUND OF THE INVENTION

Various Attitude and Heading Reference Systems ("AHRS") have been developed for the monitoring and estimation of flight parameters thereby assisting a pilot in the control and operation of an aircraft. These systems typically sense and transmit the body angles (pitch, roll, and heading), body rates and body accelerations of an aircraft. The transmitted data is typically used by cockpit displays or autopilot systems.

Older AHRS systems use spinning-mass inertial gyroscopes from which body angles can be sensed directly. Recently, AHRS system designers have replaced spinning mass inertial gyroscopes with solid-state rate gyroscopes. Various technologies are used for the rate gyroscopes including Fiber-Optic Gyros ("FOGs"), piezoelectric-based devices, and Micro Electro-Mechanical Sensor (MEMS) based devices. These modem AHRS systems have the advantage of lighter weight and reliability, but the disadvantage of not being able to sense body angles (pitch, roll and heading) directly. Instead, the modem AHRS systems with rate gyroscopes must integrate the sensed body rates over time to determine the body angles. Therefore, accurate determination of a rate gyroscope's bias (or zero rate position) is of critical importance to prevent accumulation of gross body angle errors.

Most modem AHRS employ three orthogonal rate gyroscopes, three orthogonal accelerometers, and three orthogonal magnetometers in a package with advanced digital signal processing. In some embodiments, the three orthogonal magnetometers are replaced by a traditional magnetic flux valve. Either type of magnetic sensor is often mounted remotely in areas where aircraft systems or structure do not cause magnetic disturbances. The orthogonal devices are typically aligned with respect to the aircraft so that the rate gyros sense roll rate, pitch rate, and yaw rate, and the accelerometers and magnetometers sense accelerations and magnetic flux with respect to the aircraft's longitudinal, lateral and vertical axes.

During periods of high dynamics, rate gyro integrations are used directly to compute body angles. During periods of low dynamics (i.e., near straight and level flight), which is the majority of a typical flight profile, parameters from other sensors are compared to the integrated body angles in order to determine proper bias values for each of the three rate gyroscopes. This comparison is done via a filtering algorithm, with the Kalman filter being the most widely used method. Bias corrections for the pitch and yaw rate gyros are straightforward. For the pitch rate gyro, using the accelerometers to sense the pull of gravity provides a reliable and accurate method for bias determination. Likewise, for the yaw rate gyro, the Earth's magnetic flux provides a reliable and accurate method for bias determination. However, the determination of the roll rate gyro bias is not nearly so straightforward. Various methods have been used in the prior art, each with deficiencies.

One method is to minimize the amount of bias correction required. This is the typical approach, and requires the use of rate gyros using exotic technologies such as ring laser gyros or fiber optic gyros. These types of gyros typically have bias drift rates on the order of 2° to 5° per second per hour, which means that their rate outputs can be integrated into position readings with relatively little outside correction. What little outside correction is needed is then provided, as with the pitch rate gyro, by long term correction to perceived gravity. However, with such precision comes a very high cost. Implementing an AHRS in an aircraft with an integrated aerospace rate gyro is extremely expensive.

In contrast, less-costly MEMS gyros have drift rates an order of magnitude higher (up to 20-30° per second per minute). Such drift rates require heavy bias corrections from other sources. Erecting to perceived gravity does not work in this case, as the correction cannot be applied on a long enough term and aircraft are typically flown "balanced" which means that, in any attitude (even inverted), the perceived pull of gravity remains through the vertical axis of the aircraft. Thus, strongly erecting to perceived gravity generally causes more problems than it solves.

To solve this problem, various methods are taught by the prior art. One is to integrate the AHRS inertial platform closely with GPS derived positions. However, close coupling with GPS leads to safety concerns as the GPS system does not have sufficient integrity for driving systems with catastrophic failure modes such as an AHRS.

Another method is to use the vertical component of the Earth's magnetic field as a reference. This method is taught in U.S. Pat. No. 4,608,641 to Snell, titled Navigation Aid. Snell teaches an aircraft operating in a gravitation field and having conventional sensors for measuring true air speed, angles of incidence and yaw, rotation about x, y and z axes and acceleration therealong is provided with means for calculating the inertial component of the acceleration from data concerning the true air speed, heading and rotation of the aircraft obtained from the sensors, and means for comparing the inertial component with the total acceleration sensed, thereby to deduce the orientation of the gravitation component and hence obtain an estimate of the pitch and bank angles of the aircraft. Unlike using perceived gravity, this method is not susceptible to errors caused by aircraft accelerations. However, it requires accurate positioning information and a method for determining variations in the Earth's magnetic field.

The disclosure of each above-referenced patent and application is incorporated herein and constitute a part of the specification.

A need exists for a highly reliable and simple method and/or process to correct roll rate gyro bias in an AHRS that uses rate gyros having relatively high drift rates.

BRIEF SUMMARY OF THE INVENTION

The present invention is directed to a method and computer program product for determining the roll rate gyro bias from true air speed, heading rate and body accelerations using centripetal force equations. During low-dynamic conditions, a bank angle is calculated from centripetal force equations and compared to the bank angle derived from roll rate gyro integrations. A correction to the roll rate gyro bias is determined from the difference.

In one aspect of the invention, the roll rate gyro bias is adjusted by means of feeding the centripetal force bank angle into a Kalman filter.

In a further aspect of the invention, a simplified version of the centripetal force equation is used to completely decouple the calculation of the centripetal force derived bank angle from the roll rate gyro integration derived bank angle.

Although especially useful with automotive grade MEMS rate gyros, the method and computer program product may be utilized with other gyros with various drift rates.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

It is known that the bank angle of an aircraft can be calculated from true airspeed, body accelerations and heading rate using centripetal force equations. For example, U.S. Pat. No. 4,343,035 to Tanner is titled Heading Reference System. Tanner teaches an aircraft heading reference system that includes a rate gyro for sensing the yaw rate of the aircraft and producing electrical signals representative thereof; a rate gyro for sensing the pitch rate of the aircraft and producing electrical signals representative thereof; an air speed sensor for sensing air speed of the aircraft and producing electrical signal representative thereof; a roll angle computer circuit responsive to the electrical signals representative of the yaw rate, pitch rate, and air speed for determining an electrical signal representative of the roll angle according to an expression: (yaw rate)+(pitch rate)×tan(roll angle)=(tan(roll angle)/cos(roll angle)×(g/velocity); and a yaw and pitch computer circuit, responsive to the pitch rate, yaw rate, and roll angle electrical signals for resolving the yaw and pitch rates about the roll angle to provide an electrical signal representative of the heading rate of the aircraft.

The present invention has been devised to use the above known characteristic to provide a comparison roll angle in order to determine the roll rate gyro bias in an AHRS. In its most generic terms, centripetal acceleration is the product of tangential velocity and turn rate. In the case of an aircraft, the tangential acceleration will be a combination of body accelerations and the result of pointing the aircraft lift vector by banking. One expression well known in the art for turning, balanced (no lateral accelerations) flight is:

$$ROT=1091*TAN(Bank)/V$$

where Bank is in degrees, ROT is heading rate in degrees per second, V is true airspeed in knots, and 1091 is a constant used for units conversion. The above expression is made more generic by accounting for body accelerations as follows:

$$ROT=1091*[Ay*COS(Bank)+Az*SIN(Bank)]/V$$

where Ay is lateral acceleration in G's and Az is vertical acceleration in G's.

Optimally, the rate gyro bias correction algorithm is used during low dynamic conditions (i.e, near straight and level flight). Thus the heading rate can be treated as equivalent to the yaw rate sensed directly from the yaw rate gyro. This simplifying assumption eliminates unwanted coupling in the Kalman filter due to the potential use of bank angle to determine heading when an orthogonal magnetometer package is used. In this case, the expression simplifies to:

$$Yaw\ Rate=1091*[Ay*COS(Bank)+Az*SIN(Bank)]/V$$

Solving the above relationships for Bank, the AHRS can erect to the calculated Bank angle by means of a Kalman filter. The result of the algorithm change is a dramatic improvement in system performance over a system that erects to perceived gravity. In addition, because True Aispeed can come from high-integrity sensors, the resulting package is very safe.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for correcting a bias of a roll rate gyro utilized in an Attitude and Heading Reference System, said method comprising:
   (a) monitoring the heading rate of an aircraft;
   (b) monitoring at least the lateral and vertical body accelerations of the aircraft;
   (c) monitoring the true airspeed of the aircraft;
   (d) calculating a bank angle from the above using centripetal force equations;
   (e) comparing said calculated bank angle with the bank angle derived from integrating the output of said roll rate gyro; and
   (f) when the aircraft is flying in a low-dynamic state, adjusting said bias so that the bank angle derived from integrating the output of said roll rate gyro converges with the bank angle calculated from the centripetal force equations; and
   (g) using the bias adjusted bank angle to erect the attitude and heading reference system while the aircraft is flying.

2. The method of claim 1, wherein the bank angle calculated from the centripetal force equations is determined according to the equation:

$$ROT = K*[Ay*COS(Bank) + Az*SIN(Bank)]/V$$

where Bank is bank angle, ROT is heading rate, V is true airspeed, Ay is lateral acceleration, Az is vertical acceleration, and K is a units conversion constant.

3. The method of claim 1, wherein the bank angle calculated from the centripetal force equations is determined according to the equation:

$$\text{Yaw Rate} = K*[Ay*COS(Bank) + Az*SIN(Bank)]/V$$

where Bank is bank angle, Yaw Rate is yaw rate as sensed directly from a yaw rate gyro, V is true airspeed, Ay is lateral acceleration, Az is vertical acceleration, and K is a units conversion constant.

4. The method of claim 1, wherein steps (a) through (g) are performed on a continuous periodic basis while the aircraft is in flight.

5. The method of claim 1, wherein steps (e) and (f) are performed by means of a Kalman filter.

6. A computer program product for correcting a bias of a roll rate gyro utilized in an Attitude and Heading Reference System, said program product comprising:
   a computer readable storage medium having a computer readable program embodied in said medium, said computer readable program having:
   first computer instructions for monitoring the heading rate of an aircraft;
   second computer instructions for monitoring at least the lateral and vertical body accelerations of the aircraft;
   third computer instructions for monitoring the true airspeed of the aircraft;
   fourth computer instructions for calculating a bank angle from the above using centripetal force equations;
   fifth computer instructions for comparing said calculated bank angle with the bank angle derived from integrating the output of said roll rate gyro; and
   sixth computer instructions for, when the aircraft is flying in a low-dynamic state, adjusting said bias so that the bank angle derived from integrating the output of said roll rate gyro converges with the bank angle calculated from the centripetal force equations; and
   seventh computer instructions for using the bias adjusted bank angle to erect the attitude and heading reference system of the aircraft while the aircraft is flying.

7. The computer program product of claim 6, wherein the bank angle calculated from the centripetal force equations is determined according to the equation:

$$ROT = K*[Ay*COS(Bank) + Az*SIN(Bank)]/V$$

where Bank is bank angle, ROT is heading rate, V is true airspeed, Ay is lateral acceleration, Az is vertical acceleration, and K is a units conversion constant.

8. The computer program product of claim 6, wherein the bank angle calculated from the centripetal force equations is determined according to the equation:

$$\text{Yaw Rate} = K*[Ay*COS(Bank) + Az*SIN(Bank)]/V$$

where Bank is bank angle, Yaw Rate is yaw rate as sensed directly from a yaw rate gyro, V is true airspeed, Ay is lateral acceleration, Az is vertical acceleration, and K is a units conversion constant.

9. The computer program product of claim 6, wherein said computer instructions are performed on a continuous periodic basis while the aircraft is in flight.

10. The computer program product of claim 6, wherein said fifth and sixth computer instructions implement a Kalman filter.

* * * * *